United States Patent
Marucheck et al.

(10) Patent No.: US 7,519,713 B2
(45) Date of Patent: Apr. 14, 2009

(54) MAPPING BETWEEN OBJECT ORIENTED AND SERVICE ORIENTED REPRESENTATIONS OF A DISTRIBUTED APPLICATION

(75) Inventors: Michael Jon Marucheck, Bellevue, WA (US); Ryan Thomas Sturgell, Seattle, WA (US); Alex DeJarnett, Seattle, WA (US); Eric K. Zinda, Seattle, WA (US); Jesus Ruiz Scougall, Sammamish, WA (US); Stephen T. Swartz, Seattle, WA (US); Stephen J. Millet, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 11/051,043

(22) Filed: Feb. 4, 2005

(65) Prior Publication Data

US 2006/0179146 A1 Aug. 10, 2006

(51) Int. Cl.
 G06F 15/16 (2006.01)
 G06F 3/00 (2006.01)
(52) U.S. Cl. .................. 709/227; 709/232; 719/330
(58) Field of Classification Search ......... 709/201–203, 709/217–232; 719/314–315, 330, 332
See application file for complete search history.

(56) References Cited

FOREIGN PATENT DOCUMENTS

WO WO 2004/003770 1/2004

OTHER PUBLICATIONS

International Search Report from EP 1,688,837 A1.*
Bigatti, Massimiliano, "Web Services Integration Patterns, Part 1", XML.com, Jun. 16, 2004, URL http://www.xml.com/pub/a/ws/2004/06/16/patterns.html.
Jones, Kevin, "Employ Sun's JAX-RPC SI Toolkit to Write a Client Component for Your Organization's Web Services", *JAVAPRO*, Dec. 10, 2004, URL of http://www.ftponline.com/javapro/2005_01/magazine/features/kj.
Sharma, Anil, "Introduction to Web Services Metadata", *dev2dev*, Oct. 16, 2004, URL of http://dev2dev.bea.com/pub/a/2004/10/Anil_WServices.html.
"Web Services Metadata for the Java™ Platform." *Public Review Draft Specification*, Version 0.9, Sep. 2, 2004, pp. 1-45.

* cited by examiner

*Primary Examiner*—Yasin M Barqadle
(74) *Attorney, Agent, or Firm*—Workman Nydegger

(57) ABSTRACT

The present invention extends to mapping between object oriented and service oriented representations of a distributed application. A computer system accesses an annotated object oriented representation of a service, which is annotated with service description attributes mapping included objects to corresponding service oriented elements in a service oriented representation of the service. The computer system identifies a service description attribute that annotates an object of the annotated object oriented representation. The computer system maps the object to a corresponding service oriented element in accordance with service description information contained in the identified service description attribute. The computer system outputs a channel object configured to implements behaviors and data formats described in the service oriented representations. The computer system initiates a channel that is compatible with behaviors and data formats of the service.

20 Claims, 4 Drawing Sheets

MAPPING BETWEEN OBJECT ORIENTED AND SERVICE ORIENTED REPRESENTATIONS OF A DISTRIBUTED APPLICATION

CROSS-REFERENCE TO RELATED APPLICATIONS

Not applicable.

BACKGROUND OF THE INVENTION

1. The Field of the Invention

The present invention relates to distributed applications and, more particularly, to mapping between object oriented and service oriented representations of a distributed application.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "sending computing system") constructs or otherwise accesses an electronic message and transmits the electronic message over a network to another computing system (referred to herein as a "receiving computing system"). The electronic message may be read by a human user as when the electronic message is an e-mail or instant message, or may be read, instead, by an application running on the receiving computing system. The electronic message may be constructed by an application running on the sending computing system with the possible assistance of a human user.

In some environments, such as, for example, a service oriented architecture environment, connection endpoints (often and hereinafter referred to as "services") communicate with one another to implement desired functionality. Desired functionality can be as simple as two services exchanging data. For example, a service consumer can send a service request message to a service provider. The service provider processes the service request and returns a service response message to the service consumer. However, desired functionality can also be more complex involving a number of services exchanging messages to coordinate some activity. A service typically has some type of computer system (both hardware and software) that supports the connection endpoints.

Service oriented concept descriptions (addresses, bindings, and message interaction patterns) can be used to describe a service. The service oriented concept descriptions can then be accessed by service consumers that desire to communicate the described service. Generally, service oriented concepts are described in accordance with some service oriented standard, such as, for example, Distributed Component Object Model ("DCOM"), Common Object Request Broker Architecture ("CORBA"), or Web services. Web services can be further defined in accordance with various Web services specifications, such as, for example, Web Services Description Language ("WSDL"), Web Services Policy Framework ("WS-Policy"), etc.

Thus, a service provider can describe a service using WSDL. On a Local Area Network ("LAN") or possibly even between known interconnected networks, the service provider can publish the description to a directory of services, for example, that uses Universal Description, Discovery, and Integration ("UDDI"). An aware service consumer with access to the directory can issue queries against the directory to locate a WSDL service description. Portions of the WSDL service description published by the service provider can be passed on to the service consumer in response to a query. The service consumer uses the portions of the WSDL service description to send appropriately formatted requests to the service provider. In turn, the service provider provides an appropriate response to the service consumer.

However, to implement a service in accordance with a specified service oriented concept description, there must be executable modules that process messages as described in the service oriented concept description. Thus, a developer typically writes source code (e.g., in an object oriented language, such as C#, C++, or Visual Basic) to implement message processing for the service as described in the service oriented concept description. The source code can then be compiled into an executable module (e.g., a dynamic link library) and executed, for example, as a server runtime, to provide the service to service consumers.

Unfortunately, services can utilize different programming models that implement distributed messaging functionality in different ways. For example, one programming model can implement a request message using one interface and a corresponding reply message using a second different interface. On the other hand, another programming model can implement both a request message and a corresponding reply message using a single interface that has separate methods. The single interface can have one method for the request message and a second different method for the corresponding reply message. Thus, services based on different programming models typically cannot communicate with one another.

Further, distributed applications are typically rigid in their programming models allowing only one programming model that is tightly coupled to their service runtime. Accordingly, for compatibility, a client runtime (e.g., at a service consumer) is also typically required to process messages in accordance with the programming model used to develop a corresponding service runtime. For example, if a service runtime was developed using separate interfaces for request and reply messages and using particular security mechanisms, the client runtime must implement those as well. Failure to use a client runtime developed in accordance with the same programming model can prevent a client runtime from communicating with a service runtime.

Unfortunately, there is always some chance that no service description has been published for a service runtime. Further, even when a service description has been published, a client may be unaware that the published service description exists, or may be prevented (e.g., by security mechanisms or network conditions) from accessing the published service description. On larger distributed networks, such as, for example, the Internet, the chances of such difficulties occurring substantially increase. Thus, it may be difficult, if not impossible, to implement a client runtime in accordance with the appropriate programming model. As a result, the client may be prevented from communicating with a server runtime.

Therefore systems, methods, and computer program products for accessing a service description in other ways would be advantageous.

BRIEF SUMMARY OF THE INVENTION

The foregoing problems with the prior state of the art are overcome by the principles of the present invention, which are directed towards methods, systems, and computer program products for mapping between object oriented and service oriented representations of a distributed application. A computer system accesses an annotated object oriented representation of a service. The annotated object oriented representation is annotated with service description attributes that map objects included in the object oriented representation to corresponding service oriented data elements in a service oriented representation of the service.

The computer system identifies a service description attribute that annotates an object of the annotated object oriented representation. The computer system maps the object to a corresponding service oriented element in accordance with service description information contained in the identified service description attribute. The computer system outputs a channel object that is configured to implement behaviors and format data as described in the service oriented representation. The computer system initiates a channel that is compatible with behaviors and data formats of the service.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
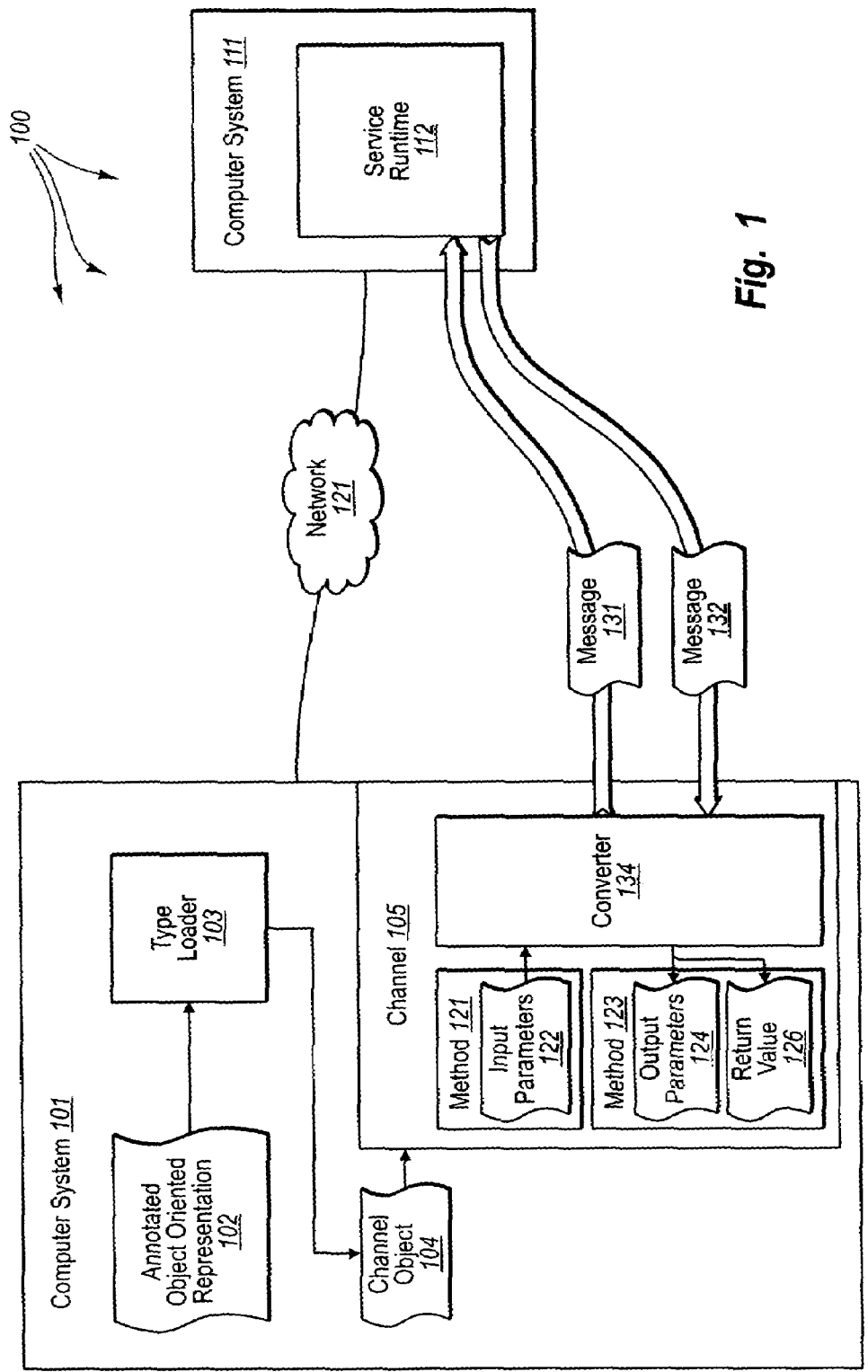
FIG. 1 illustrates an example of a computer architecture that facilitates mapping between object oriented and service oriented representations of a distributed application.

The foregoing problems with the prior state of the art are overcome by the principles of the present invention, which are directed towards methods, systems, and computer program products for mapping between object oriented and service oriented representations of a distributed application. A computer system accesses an annotated object oriented representation of a service: The annotated object oriented representation is annotated with service description attributes that map objects included in the object oriented representation to corresponding service oriented data elements in a service oriented representation of the service.

The computer system identifies a service description attribute that annotates an object of the annotated object oriented representation. The computer system maps the object to a corresponding service oriented element in accordance with service description information contained in the identified service description attribute. The computer system outputs a channel object that is configured to implement behaviors as described in the service oriented representation and to format data as described in the service oriented representation. The computer system initiates a channel that is compatible with behaviors and data formats of the service.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, an "object" is defined as any item that can be individually selected and manipulated. Object is defined to include software objects, such as, for example, methods and other software objects, that include data and procedures to manipulate the data. Object is also defined to include parameters and return values (e.g., method parameters and method return values) that can be exchanged between (e.g., provided as input to or output from) software objects.

In this description and in the following claims, a "contract" is defined as a declarative programming model including the description of a message format and message interaction pattern.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

As depicted in computer architecture 100 computer systems 101 and 111 are connected to network 121. Network 121 can be a Local Area Network ("LAN"), Wide Area Network ("WAN"), or even the Internet. Computer systems connected to network 121 can receive data from and send data to other computer systems connected to network 121. Accordingly, computer systems 101 and 111, as well as other connected computer systems (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 121. For example, computer systems 101 and 111 can create SOAP envelopes and exchange SOAP envelopes over network 121.

Computer system 101 includes type loader 103 and channel 105. Type loader 103 is configured to receive annotated object oriented representations of a service (e.g., a service type). For example, type loader 103 can be configured to receive a service type (e.g., a Common Language Runtime ("CLR") type) or other object-oriented object representing a network-based service. In some embodiments, a network-based service is represented in accordance with a specified programming model. The specified programming model can be a type that implements one or more interfaces. Each interface can further implement one or more methods. Each method can be configured to exchange input parameters, output parameters, and return values.

The interfaces, methods, input parameters, output parameters, and return values included in a type can be annotated with service description attributes that description corresponding service oriented elements. For example, service description annotations can map an object oriented interface to a service oriented contract, etc. Accordingly, type loader 103 can load a service type and parse compiled code to identify mappings to a service oriented representation of a service. Type loader 103 can use mappings to generate relevant service description information of the service oriented representation. For example, type loader 103 can refer to a service description attribute of an object oriented interface to create service oriented description for a corresponding contract, binding, and address. Type loader 103 can then generate a channel object of a type included in the object oriented representation. The channel object can then be used to initiate an appropriate channel for accessing the service.

Generally, channel 105 is used to compatibly communicate with a corresponding service runtime of a service. Channel 105 can include modules, such as, for example, method 121, method 123, and converter 134, that facilitate compatible communication.

Method 121 can submit input parameters (e.g., input parameters 122) to converter 134. Converter 134 can then convert the input parameters (in accordance with previously accessed service description information) into an appropriately formatted message (e.g., a request message) and send the appropriately formatted message to a corresponding service runtime. Subsequently, the service runtime can return a similarly formatted message (e.g., a reply message), including output parameters and/or a return value, to converter 134. Converter 134 can convert the received message parameters (in accordance with previously accessed service description information) into output parameters (e.g., output parameters 124) and/or return values (e.g., return value 126). Converter 134 can submit the output parameters (and/or return values) to method 123.

Computer system 111 includes service runtime 112. Service runtime 112 can expose a service (in accordance with service description information) that performs some function. For example, service runtime 112 can expose a calculator service capable of performing various mathematical operations.

In some embodiments, service description information is arranged in a tree format. Service description information can include one or more endpoints (of appropriate endpoint classes). Endpoints can include an endpoint address, a binding, and one or more contract descriptions. An endpoint address is an electronic address (e.g., a Uniform Resource Locator ("URL")) for communicating with a described service (e.g., service runtime 112).

A binding indicates how data is to be transferred when communicating with the described service. A binding can include a plurality of different binding elements, such as, for example, a transport binding element (e.g., use HyperText Transfer Protocol ("HTTP") or Transmission Control Protocol ("TCP")), an encoder binding element (e.g., use UTF-8 or UTF-16), security binding elements (e.g., use a specified type of encryption), etc., applicable to different transfer characteristics.

A contract description indicates what data is to be transferred (e.g., a message interaction pattern) when communicating with the described service. A contract description can include one more operations. For example, a contract description for a network-based math service can include operations for addition, subtraction, multiplication, and division. Each operation can include one or more messages. For example, an addition operation can include a request message including two integers and a reply message including the sum of the two integers.

Thus, a contract description can indicate message interaction patterns for communicating with a network-based service (e.g., service runtime 112). Some operations can include a single message, for example, an input or output message.

Other operations can include two messages, for example, a request message and a reply message.

Figure 2:
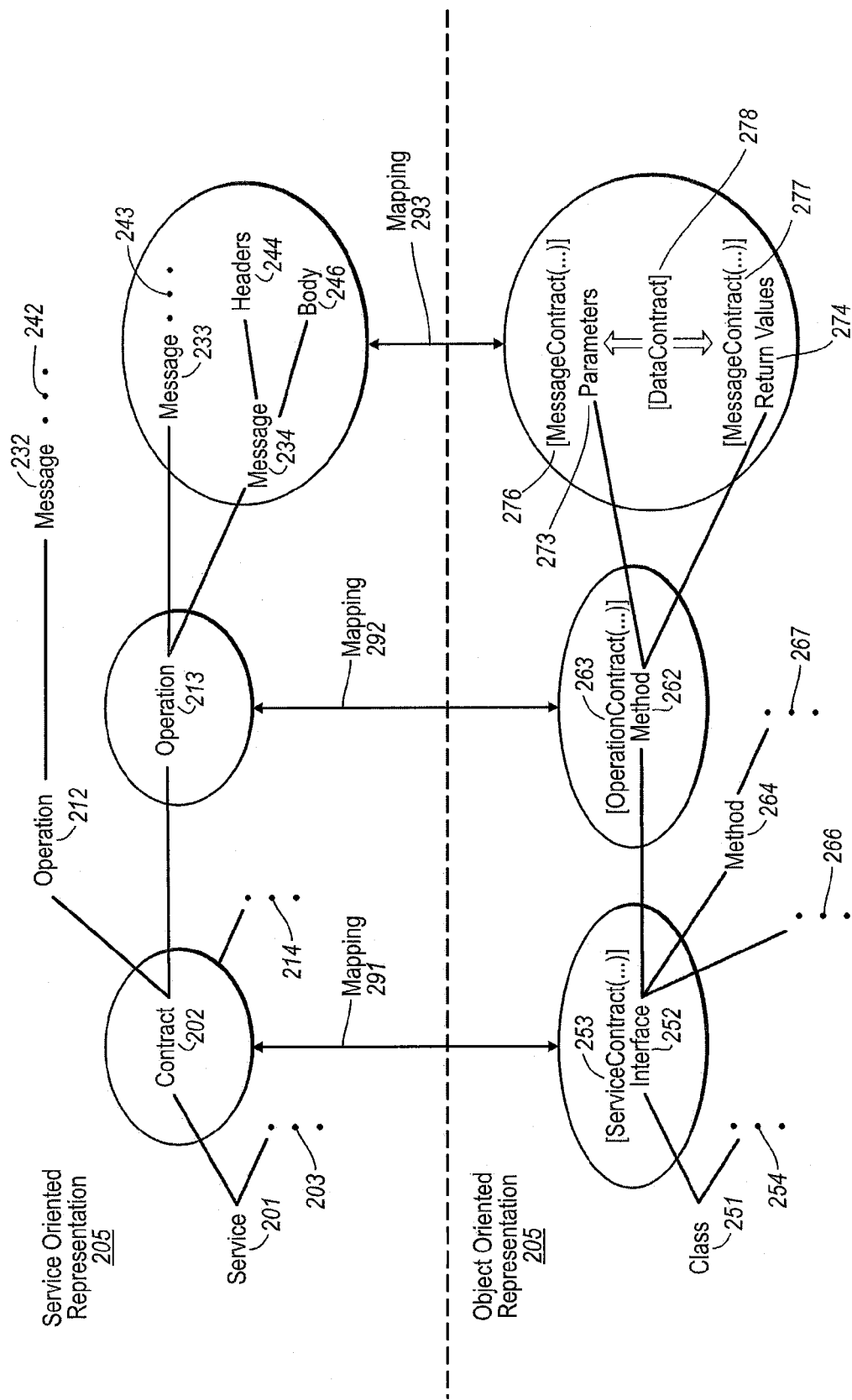
FIG. 2 illustrates an example mapping between an object oriented representation of a distributed application and a service oriented representation of the same distributed application.

Referring now to FIG. 2, FIG. 2 illustrates an example mapping between an object oriented representation 255 of a distributed application and a service oriented representation 205 of the same distributed application. Within service oriented representation 205, service 201 includes contract 202. Contract 202 represents an implementation of service 201 in accordance with a specified programming model. Vertical ellipsis 203 (a vertical series of three periods) represents that other contracts can implement service 201 in accordance with other programming models.

Contract 202 includes operations 212 and 213 that represent behaviors of the service implementation. For example, if contract 202 represents a programming model for a math service, operations 212 and 213 can represent particular mathematical operations (e.g., addition, subtract, etc.). Vertical ellipsis 214 represents that other operations can be included in contract 202. Each operation can be implemented in accordance with a specified message interaction pattern. In some embodiments, a message interaction pattern is one of an input message, an output message, or a request message and corresponding reply message.

For example, operation 212 includes message 232 (an input or output message). On the other hand, operation 213 includes, message 233 (a request message) and message 234 (a reply message). Further data elements can be used to describe the content and format of data included in a message. For example, headers 244 and body 246 can describe a data format for message 234 (e.g., a SOAP message format). Ellipsis 242 (a horizontal series of three periods) represents that further data elements can be used to describe the content of message 232. Ellipsis 243 (a horizontal series of three periods) represents that further data elements can be used to describe the content of message 232.

Within object oriented representation 255, class 251 (e.g., CLR type) includes interface 252. As depicted, interface 252 is annotated with service contract attribute 253.Service contract attribute 253 can include service description information describing contract 202 (and potentially also an address and binding). Accordingly, as represented by mapping 291, interface 252 is mapped to contract 202 (and potentially also an address and binding). Vertical ellipsis 254 represents that class 251 can include other (potentially annotated) interfaces (e.g., mapping to other programming models for implementing service 201).

Interface 252 includes methods 262 and 264. As depicted, method 262 is annotated with operation contract attribute 263. Operating contact attribute 263 can include service description information describing operation 213. Accordingly, as represented by mapping 292, the behavior described for operation 213 (e.g., calculating the sum of two numbers) can be mapped to method 262. Although not expressly depicted, method 264 can also be annotated and can be mapped to an operation of contract 263. Vertical ellipsis 266 represents that interface 252 can include other (potentially annotated) methods (e.g., mapping to other operations of contract 202).

Method 262 includes parameters 273 and return value 274. As depicted, parameters 273 are annotated with message contract attribute 276 and return value 274 is annotated with message contract attribute 277. Message contract attribute 276 can service description information describing data elements of message 233. Similarly, message contract attribute 277 can include service description information describing data elements of message 234. In some embodiments, the described data elements are eXstensible Markup Language ("XML") elements.

Parameters 273 and return value 274 are also annotated with data contract attribute 278. Data contract attribute 278 can include service description information describing data formats used in messages 233 and 234. For example, data contract attribute 278 can refer to descriptive information that indicates data elements of messages 233 and 234 are to be integer values (or some other type of value). Accordingly, as represented by mapping 293, the data elements and formats described in message 233 (e.g., XML data elements for two integer values) can be mapped to parameters 273 and the data elements described in message 234 (e.g., an XML data element for the sum of the two integer values) can be mapped to return value 274.

Vertical ellipsis 267 represents that there may be similar data element and data format mappings between input parameters, output parameters, and/or a return value of method 264 and other messages within contract 212.

Embodiments of the present invention allow external service description information to be generated from service description information included in a class (e.g., a service type) and that can be used to initiate a channel. With access to the service description information, a corresponding channel can be more efficiently configured for communicating with a described service. For example, a developer can provide service description information for endpoints (including contracts, bindings, and addresses) behaviors, data elements, and data formats for a service from within an object oriented representation of the service. Accordingly, interoperability between a channel and a service runtime can be achieved in a more efficient manner.

The following example code instructions depict an interface and included method annotated with a service contract attribute and an operation contact attribute respectively:

```
Line 1:  [ServiceContractAttribute(<Service Description Information
         A>)]
Line 2:  interface IExample
Line 3:  {
Line 4:        [OperationContractAttribute(<Service
               Description Information B>)]
Line 5:        void Example( );
Line 6:  }
```

The attribute [ServiceContractAttribute] at Line 1 annotates the interface IExample at line 2. [ServiceContractAttribute] includes <Service Description Information A> which describes, for example, a service endpoint. A service endpoint can include a contract, such as, for example, contract 202, a binding, and address. The attribute [OperationContractAttribute] at Line 4 annotates the method Example at line 4. [OperationContractAttribute] includes <Service Description Information B>, which describes, for example, a service oriented operation (e.g., operation 213) <Service Description Information B> can also include a Uniform Resource Identifier (a name) that is to be included in messages that are exchanges as part of the service oriented operation.

The example code instructions can be used in configuration information to define a communications end point. For example:

```
Line 7:     <endpoints>
Line 8:        <endpoint
Line 9:            address="http://localhost/Example/Ep1"
Line 10:           binding="basicProfileHttpBinding"
Line 11:           contract="IExample"/>
Line 12:    </endpoints>
```

Lines 7 and 12 represent the beginning and end of defined endpoints respectively. Lines 8 through 11 represent the definition of a particular endpoint. Line 9 represents the address for the endpoint. Line 10 represents the binding for the endpoint, for example including the transport protocol, security settings, etc. Line 11 refers to a contract represented by the above described example code instructions. Line 11 indicates that messages transferred through this endpoint are to be processed (e.g., converted between XML and object oriented parameters and vice versa) in accordance with the described example code instructions. A channel runtime can implement the functionality for transferring control of messages between an endpoint and the appropriate executable code.

Figure 3:
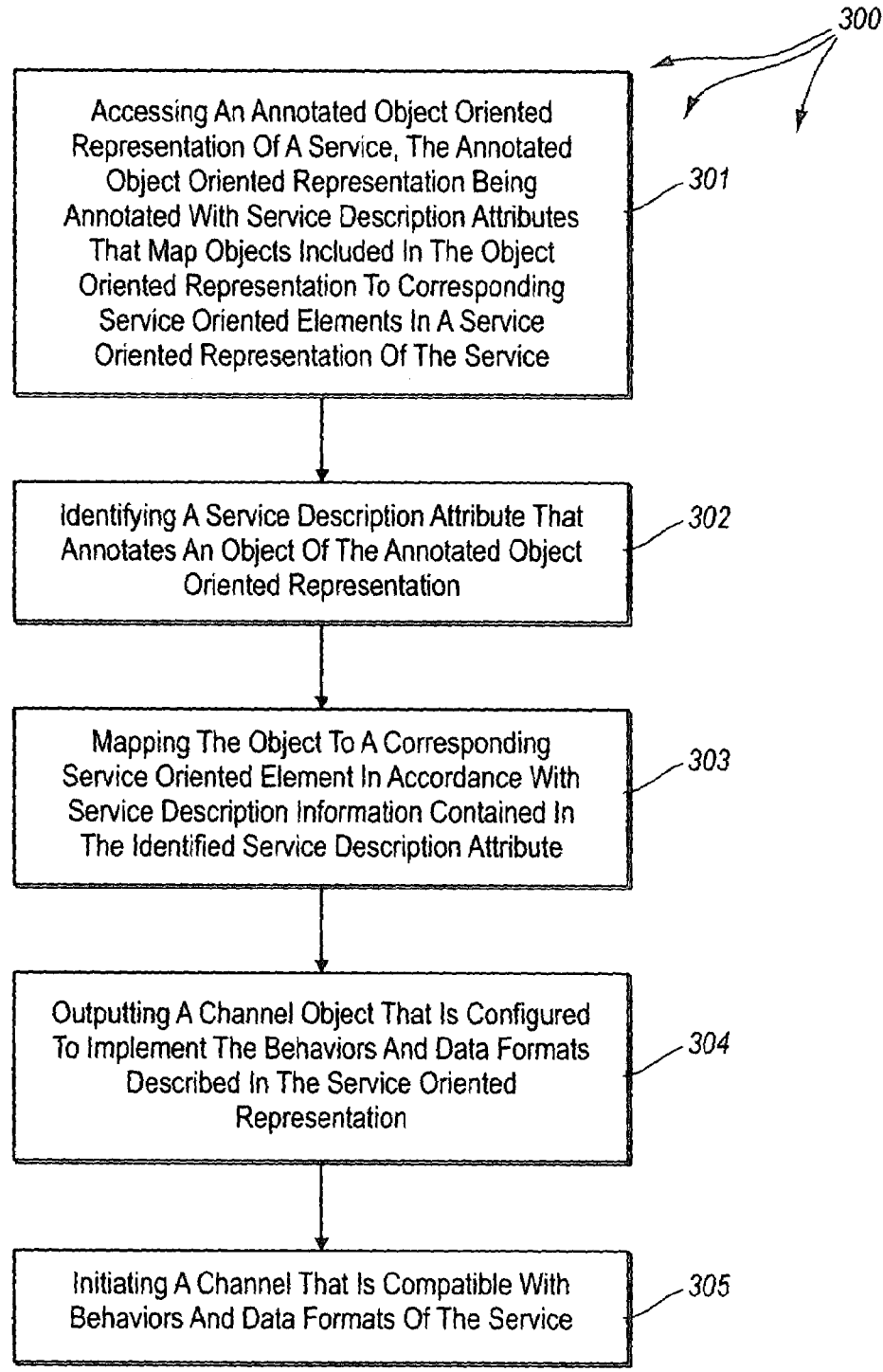
FIG. 3 illustrates an example flow chart of a method for initiating a channel stack.

FIG. 3 illustrates an example flow chart of a method 300 for initiating a channel stack. FIG. 3 will be described with respect to the components and data in computer architecture 100, service oriented representation 205, and object oriented representation 255.

Method 300 includes an act of accessing an annotated object oriented representation of a service, the annotated object oriented representation being annotated with service description attributes that map objects included in the object oriented representation to corresponding service oriented data elements in a service oriented representation of the service (act 301). For example, type loader 103 can access annotated object oriented representation 102. Annotated object oriented representation 102 can represent a typed class (e.g., a CLR class) similar to class 251. Annotated object oriented representation 102 can include one or more interfaces (e.g., interface 252). Each interface can include one or more methods (e.g., method 262) having input parameters (e.g., input parameters 273) and output parameters and/or a return value (e.g., return value 274). The objects (interfaces, methods, parameters, etc) include in annotated object oriented representation 102 can be annotated with service description attributes.

Method 300 includes an act of identifying a service description attribute that annotates an object of the annotated object oriented representation (act 302). For example, type loader 103 can identify a service contract attribute (e.g., service contract attribute 253) that annotates an interface of annotated object oriented representation 102. The service a contact attribute can include a name and namespace that are used in a WSDL XML document and/or configuration information for configuring a channel.

Other types of attributes can also be identified. For example, type loader 103 can identify operation contract attributes (e.g., operation contract attribute 263), message contract attributes (e.g., message contract attribute 263), message contract attributes (e.g., message contract attribute 276), and data contract attributes (e.g., data contract attribute 278). These other types of attributes can include names and namespaces that are used in a WSDL XML document.

Method 300 includes an act of mapping the object to a corresponding service oriented element in accordance with service description information contained in the identified service description attribute (act 303). For example, type loader 103 can map interfaces, methods, parameters and/or return values from annotated object oriented representation 102 (to corresponding service oriented elements). For example, interface 252 can be mapped to contract 202, method 262 can be mapped to operation 213, parameters 273 can be mapped to messages 232 and 234 in accordance with service description data contained in service contract attribute 253, operation contract attribute 263, and message contract attribute 276 respectively.

Method 300 includes an act of outputting a channel object that is configured to implement the behaviors and data formats described in the service oriented representation (act 304). For example, based on service description information contained in service description attributes, type loader 103 can generate and output channel object 104. Channel object 104 can be of a type (e.g., class 251) included in annotated object oriented representation 102. Channel object 104 can be subsequently loaded to initiate a corresponding channel in accordance with the contained service description information. For example, channel object 104 can be used to implement behaviors (e.g., operations) and format data (e.g., messages 233 and 234) as described in the service description information.

Method 300 includes an act of initiating a channel that is compatible with the behaviors and data formats of the service (act 305). For example, computer system 101 can initiate channel 105 from channel object 104. Channel 105 can be compatible with the behaviors (e.g., operations) and data formats (e.g., messages, headers, bodies) of service runtime 112.

Converter 134 can include a message description for converting between object oriented parameters and the appropriate message format (e.g., SOAP messages including XML instructions) and vice versa. For example, converter 134 can receive input parameters 122 from method 121, can convert input parameters 122 into the appropriate format (e.g., in accordance with mapping 293), and include the converted input parameters 122 in message 131 (a SOAP message). Service 112 can receive message 131, can process message 131 (e.g., calculating the sum of two integers), and can return message 132 (a SOAP message).

Message 132 can be of the same or a similar format as message 131 and can include one or more appropriately formatted output parameters and/or a return value. Converter 134 can receive message 132, convert appropriately formatted output parameters and/or a return value into object oriented parameters and/or a return value, and submit the object oriented parameters and/or a return value to the appropriate method. For example, converter 134 can extract appropriately formatted oriented parameters and/or a return value, convert to output parameters 124 and return value 126, and submit output parameters 124 and return value 126 to method 123.

Figure 4:
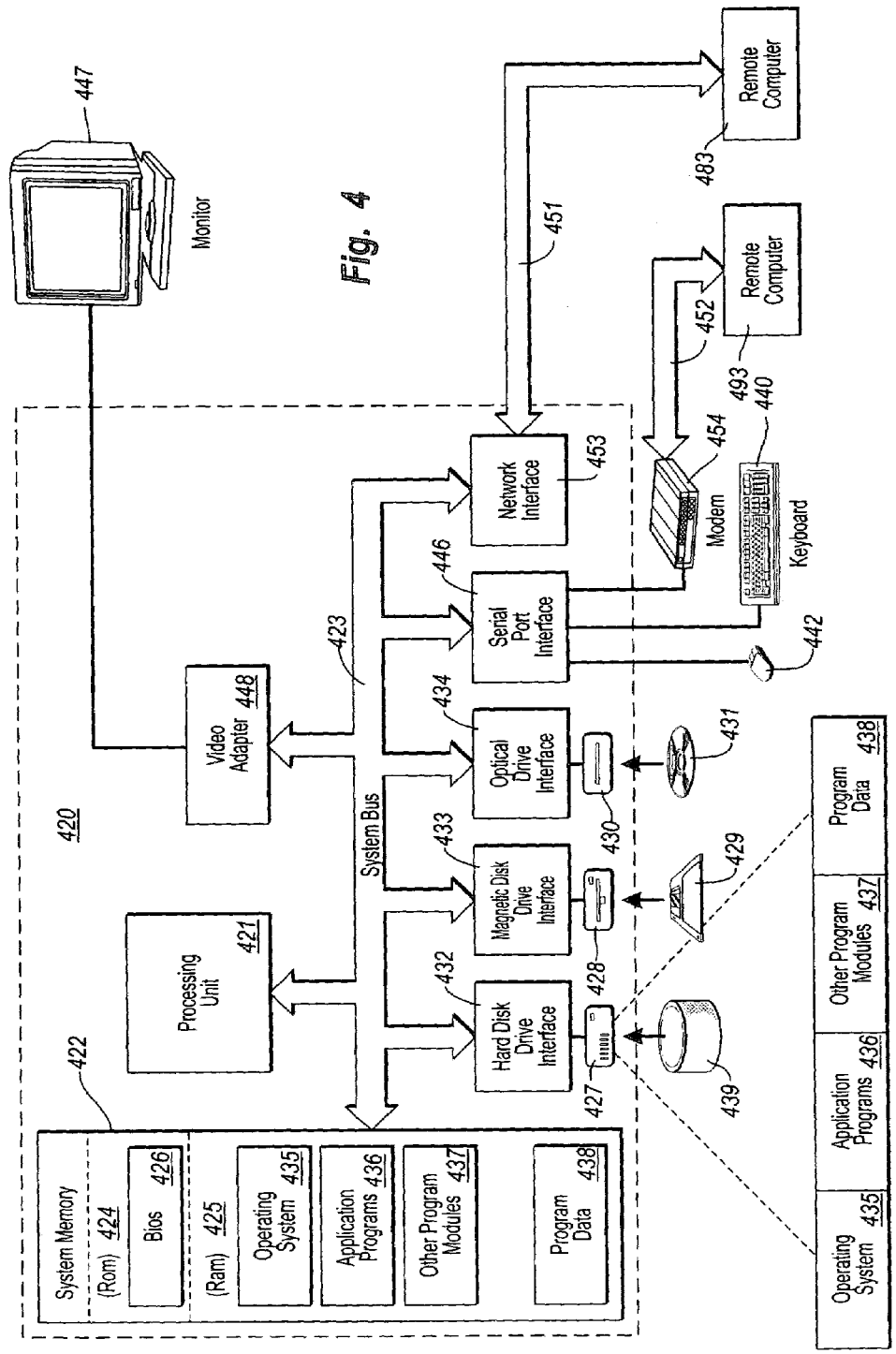
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide non-volatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Other peripheral output devices (not shown), such as, for example, speakers and printers, can also be connected to computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem) via link 459, through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules including type loaders, channels, and service runtimes as well as associated data, including, annotated object oriented representations, channel objects, service oriented representations, and messages may be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computer system, a method of initiating a channel runtime, the method comprising:

an act of accessing an annotated object oriented representation of a service, the annotated object oriented representation being annotated with service description attributes that map objects included in the object oriented representation to corresponding service oriented elements in a service oriented representation of the service;

an act of identifying a service description attribute that annotates an object of the annotated object oriented representation;

an act of mapping the object to a corresponding service oriented element in accordance with service description information contained in the identified service description attribute;

an act of outputting a channel object that is configured to implement the behaviors and data formats described in the service oriented representation;

an act of initiating a channel that is compatible with behaviors and data formats of the service using the outputted channel object such that the service offered is accessible through the channel;

an act of providing the service on the initiated channel, the service utilizing a first programming model for implementing distributed messaging functionality, such that interfaces, methods, parameters and values of the first programming model are compatible with the behaviors and data formats of the service; and an act of providing a second, different service on the initiated channel, the second, different service utilizing a second, different programming model for implementing the distributed messaging functionality, such that interfaces, methods, parameters and values of the second programming model are compatible with the behaviors and data formats of the second service.

2. The method as recited in claim 1, wherein the act of accessing an annotated object oriented representation of a service comprises an act of accessing an annotated common language runtime type.

3. The method as recited in claim 1, wherein the act of accessing an annotated object oriented representation of a service comprises an act of accessing one or more objects that are mapped to behaviors of the service oriented representation.

4. The method as recited in claim 1, wherein the act of accessing an annotated object oriented representation of a service comprises an act of accessing one or more objects that are mapped to data formats described in the service oriented representation.

5. The method as recited in claim 1, wherein the act of identifying a service description attribute that annotates an object comprises an act of identifying a service contract attribute that annotates an interface such that the interface can be mapped to one or more of an address, a binding, and a contract.

6. The method as recited in claim 1, wherein the act of identifying a service description attribute that annotates an object comprises an act of identifying an operation contract attribute that annotates a method such that the method can be mapped to an operation.

7. The method as recited in claim 1, wherein the act of identifying a service description attribute that annotates an object comprises an act of identifying a message contract attribute that annotates parameters such that the parameters can be mapped to a message.

8. The method as recited in claim 1, wherein the act of mapping the object to a corresponding service oriented element comprises an act of mapping an interface to one or more of a an address, a binding, and a contract.

9. The method as recited in claim 1, wherein the act of mapping the object to a corresponding service oriented element comprises an act of mapping a method to an operation.

10. The method as recited in claim 1, wherein the act of mapping the object to a corresponding service oriented element comprises an act of mapping one of input parameters, output parameters, and a return value to a message.

11. The method as recited in claim 1, wherein the act of outputting a channel object comprises an act of outputting service description information in a tree format.

12. The method as recited in claim 1, wherein the act of initiating a channel comprises an act of configuring the channel to convert between object oriented parameters and a compatible message format of a corresponding service runtime.

13. The method as recited in claim 12, wherein the act of configuring the channel runtime to convert between object oriented parameters and a compatible message format of a corresponding service runtime comprises an act of configuring the channel to convert between common language runtime parameters and SOAP messages.

14. A computer program product for use at a computer system, the computer program product for implementing a method of initiating a channel runtime, the computer program product comprising one or more computer-readable storage media have stored thereon computer-executable instructions, that when executed by a processor, cause the computer system to perform the following:

access an annotated object oriented representation of a service, the annotated object oriented representation being annotated with service description attributes that map objects included in the object oriented representation to corresponding service oriented elements in a service oriented representation of the service;

identify a service description attribute that annotates an object of the annotated object oriented representation;

map the object to a corresponding service oriented element in accordance with service description information contained in the identified service description attribute;

output a channel object that is configured to implement the behaviors and data formats described in the service oriented representation;

initiate a channel that is compatible with behaviors and data formats of the service using the outputted channel object such that the service offered is accessible through the channel;

provide the service on the initiated channel, the service utilizing a first programming model for implementing distributed messaging functionality, such that interfaces, methods, parameters and values of the first programming model are compatible with the behaviors and data formats of the service; and provide a second, different service on the initiated channel, the second, different service utilizing a second, different programming model for implementing the distributed messaging functionality, such that interfaces, methods, parameters and values of the second programming model are compatible with the behaviors and data formats of the second service.

15. The computer-program product as recited in claim 14, wherein computer-executable instructions, that when executed, cause the computer system to access an annotated object oriented representation of a service comprise computer-executable instructions that when executed cause the computer system to access one or more objects that are mapped to behaviors described in the service oriented representation.

16. The computer-program product as recited in claim 14, wherein computer-executable instructions, that when executed, cause the computer system to access an annotated object oriented representation of a service comprise computer-executable instructions that when executed cause the computer system to access one or more objects that are mapped to data formats described in the service oriented representation.

17. The computer-program product as recited in claim 14, wherein computer-executable instructions, that when executed, cause the computer system to identify a service description attribute that annotates an object of the annotated object oriented representation comprise computer-executable instructions that when executed cause the computer system to identify a service contract attribute that annotates an interface such that the interface can be mapped to one or more of an address, a binding, and a contract.

18. The computer-program product as recited in claim 14, wherein computer-executable instructions, that when executed, cause the computer system to initiate a channel that is compatible with behaviors and data formats of the service comprise computer- executable instructions that when executed cause the computer system to configure the channel to convert between common language runtime parameters and SOAP messages.

19. At a computer system, a method of exchanging messages in accordance with a specified programming model, the method comprising:
  an act of identifying service description attributes that annotate objects in an object oriented representation of a service;
  an act of mapping the annotated objects to corresponding service oriented elements based on service description information contained in the service description attributes;
  an act of configuring a channel to implement behaviors and to format data as described in service description information such that the service offered is accessible through the channel;
  an act of providing the service on the configured channel, the service utilizing a first programming model for implementing distributed messaging functionality, such that interfaces, methods, parameters and values of the first programming model are compatible with the behaviors and data formats of the service;
  an act of providing a second, different service on the configured channel, the second, different service utilizing a second, different programming model for implementing the distributed messaging functionality, such that interfaces, methods, parameters and values of the second programming model are compatible with the behaviors and data formats of the second service;
  an act of the configured channel converting an object oriented parameter into a first compatible SOAP message for transfer to the service; and
  an act of sending the first compatible SOAP message to the service.

20. The method as described in claim 19, further comprising:
  an act of the configured channel receiving a second compatible SOAP message from the service subsequent to sending the first compatible message; and
  an act of converting the second compatible SOAP message into an object oriented parameter.

* * * * *

UNITED STATES PATENT AND TRADEMARK OFFICE
CERTIFICATE OF CORRECTION

| | | |
|---|---|---|
| PATENT NO. | : 7,519,713 B2 | Page 1 of 1 |
| APPLICATION NO. | : 11/051043 | |
| DATED | : April 14, 2009 | |
| INVENTOR(S) | : Michael Jon Marucheck et al. | |

It is certified that error appears in the above-identified patent and that said Letters Patent is hereby corrected as shown below:

In Face page, in field (75), under "Inventors" column 1, line 3, delete "DeJarnett," and insert -- DeJarnatt, --, therefor.

In column 9, line 51, after "service" delete "a".

Signed and Sealed this
Third Day of May, 2011

David J. Kappos
*Director of the United States Patent and Trademark Office*